(12) United States Patent
Groessl et al.

(10) Patent No.: US 11,498,767 B2
(45) Date of Patent: Nov. 15, 2022

(54) WINDOW CONVEYING TECHNOLOGY, PICKING SYSTEM AND MANUAL PICKING METHOD

(71) Applicant: SSI Schäfer Automation GmbH (AT), Graz (AT)

(72) Inventors: Christoph Groessl, Graz (AT); Andreas Hintz, Eglisau (CH)

(73) Assignee: SSI Schäfer Automation GmbH (AT), Graz (AT)

( * ) Notice: Subject to any disclaimer, the term of this patent is extended or adjusted under 35 U.S.C. 154(b) by 0 days.

(21) Appl. No.: 17/627,724

(22) PCT Filed: Jul. 2, 2020

(86) PCT No.: PCT/EP2020/068647
§ 371 (c)(1),
(2) Date: Jan. 17, 2022

(87) PCT Pub. No.: WO2021/008885
PCT Pub. Date: Jan. 21, 2021

(65) Prior Publication Data
US 2022/0289485 A1     Sep. 15, 2022

(30) Foreign Application Priority Data
Jul. 17, 2019    (DE) .................. 10 2019 119 356.7

(51) Int. Cl.
*B65G 1/137*    (2006.01)
(52) U.S. Cl.
CPC ........ *B65G 1/1376* (2013.01); *B65G 2209/04* (2013.01)
(58) Field of Classification Search
CPC combination set(s) only.
See application file for complete search history.

(56) References Cited

U.S. PATENT DOCUMENTS 5,271,703 A    12/1993  Lindqvist et al.
6,061,607 A *   5/2000  Bradley .............. B65G 1/1376
                                                414/280
(Continued)

FOREIGN PATENT DOCUMENTS

DE          10235865 A1    2/2004
DE       102010044614 A1   3/2012
(Continued)

OTHER PUBLICATIONS

Timm Gudehus, "Logistik" Springer Verlag, 2004, Abstract, ISBN 3-540-00606-0.
(Continued)

*Primary Examiner* — Kyle O Logan
(74) *Attorney, Agent, or Firm* — Renner, Otto, Boisselle & Sklar, LLP

(57) ABSTRACT

A picking system, a manual picking method, as well as a window-conveyor system for a manually picking goods through a picker in accordance with a picking order, wherein the window-conveyor system comprises: a conveying device for transporting the goods along a conveying path, wherein the conveying device is movable, preferably continuously and discontinuously, and wherein the conveying device includes a conveying area, on which the goods can be deposited; a lighting device configured to indicate in an order-specific manner a portion of the conveying area in terms of an order-specific window by means of light visually distinguishable from a rest of the conveying area configured to divide the conveying area into the order-specific window and the rest, and further configured to generate controlling signals for the lighting device and output the same, which cause the lighting device to indicate the order-specific window visually distinguishable on the conveying device.

14 Claims, 2 Drawing Sheets

(56) References Cited

U.S. PATENT DOCUMENTS

| | | | | |
|---|---|---|---|---|
| 7,991,506 B2 * | 8/2011 | Schafer | ............... | B65G 1/1378 |
| | | | | 414/280 |
| 8,755,931 B2 * | 6/2014 | Issing | ................. | B65G 1/1376 |
| | | | | 700/214 |
| 9,026,243 B2 * | 5/2015 | Radwallner | .......... | B65G 1/1378 |
| | | | | 700/214 |
| 9,725,242 B2 * | 8/2017 | Issing | .................... | B65G 1/137 |
| 9,771,218 B2 * | 9/2017 | Meurer | ............... | B65G 1/1378 |

FOREIGN PATENT DOCUMENTS

| | | |
|---|---|---|
| DE | 102015105942 A1 | 10/2016 |
| DE | 102018203175 A1 | 9/2019 |
| FR | 3065951 A1 | 11/2018 |
| JP | 2004-338866 A | 12/2004 |
| WO | 2018/168113 A1 | 9/2018 |

OTHER PUBLICATIONS

International Search Report and Written Opinion dated Oct. 15, 2021 in corresponding International Application No. PCT/EP2020/068647.

International Preliminary Report on Patentability dated Jan. 18, 2022 in corresponding International Application No. PCT/EP2020/068647.

* cited by examiner

PICKING WAREHOUSE  11

WINDOW-CONVEYOR SYSTEM  10

CONVEYING DEVICE  12
- ROLLER CONVEYOR  24
- CHAIN CONVEYOR  22
- LINK-CHAIN CONVEYOR  26
- BELT CONVEYOR  20
- TRANSPORT VEHICLE  28
- ...

LIGHTING DEVICE  14
- LASER POINTER  30
- BEAMER  32
- EMITTER  34
- PROJECTOR  36
- ...

CONTROLLING DEVICE  16
- ...

STORAGE DEVICES  44

CONVEYOR TECHNOLOGY  18

WAREHOUSE MANAGEMENT COMPUTER  50
- ...

Fig. 1

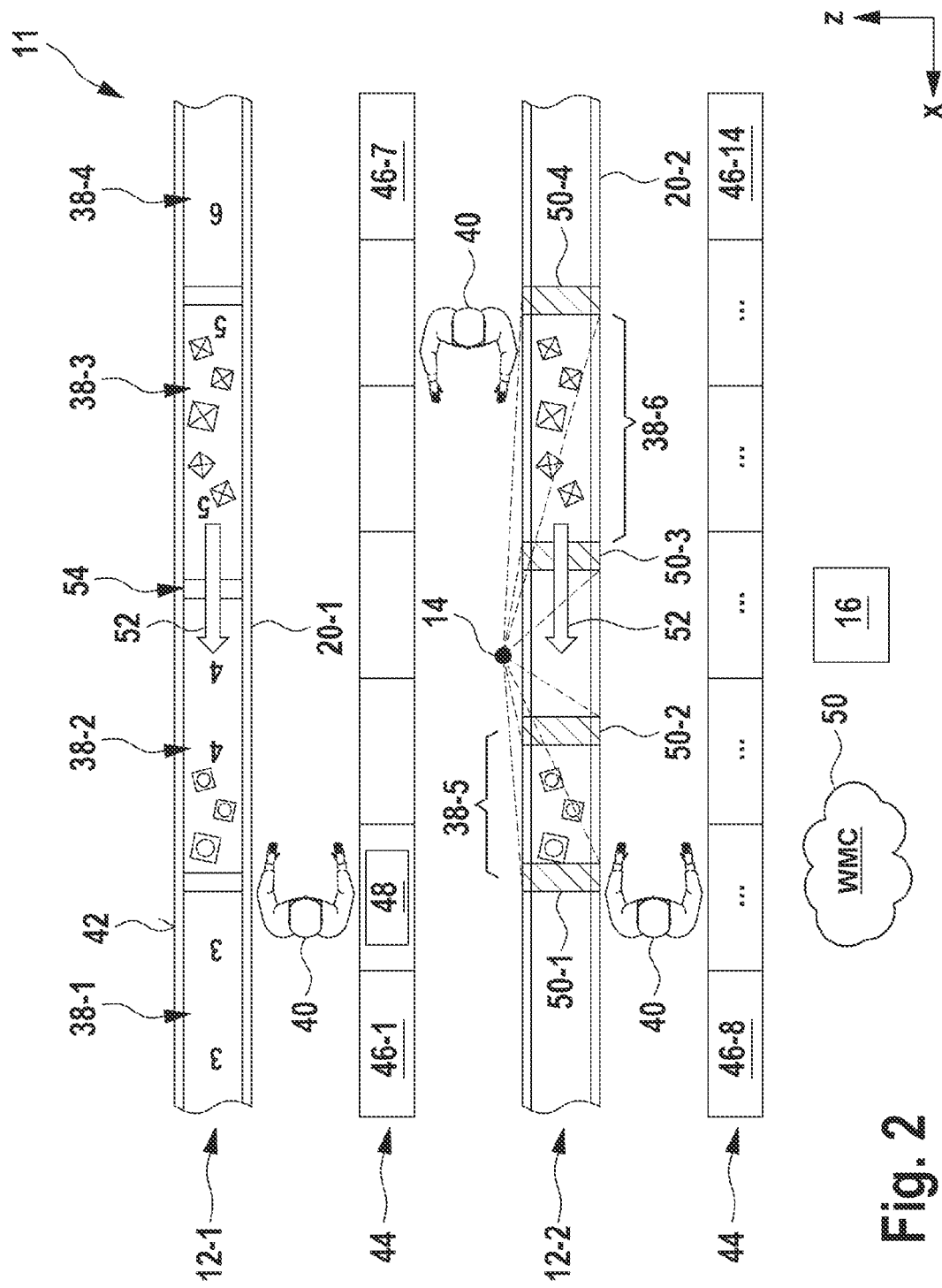

WINDOW CONVEYING TECHNOLOGY, PICKING SYSTEM AND MANUAL PICKING METHOD

This application is a national phase of International Application No. PCT/EP2020/068647 filed Jul. 2, 2020, which claims priority to German Application No. 10 2019 119 356.7 filed Jul. 17, 2019, the entire disclosure of each of which is hereby incorporated herein by reference.

The present invention relates to a conveyor operated in accordance with the so-called "window technology" where the window is adjusted dynamically. Further, the invention relates to a picking system and picking warehouse including the dynamic window-conveyor. Finally, the invention relates to a manual picking method which uses the dynamic window technology for processing a picking order.

In the present case a "(picking) order" is to be understood as a customer's order constituted by one or more order positions (order lines) including a respective amount (retrieval amount) of the line-specific type of article. Picking describes the collection of ordered articles from an assortment of articles.

A "window conveyor", or a "window-conveying device", is to be understood hereinafter as a conveyor (steady conveyor such as a belt conveyor, or unsteady conveyor such as a floor conveyor), a conveying area of which is divided (virtually, visually, and/or physically) into a plurality of portions. A (picking) order is assigned to each portion. In this portion order-specific objects (piece goods, cases, articles, packing units, goods, etc.) are collected. The portions are referred to as "windows".

In general, a "window" is a region on, or portion of, the conveyor which has a length of, for example, one or more meters, and extends over the entire width of the conveyor. If one order includes more objects than the assigned portion can receive (spatially), this order conventionally is assigned to several portions. The collecting and depositing of the objects into the order-specific portions is typically performed while the conveying means is moved along a (predefined) conveying path. The movement can be conducted continuously, or in a clocked manner.

The concept, on which the window conveyor is based, is referred to as "window technology". An exemplary conventional implementation of the window technology is the "pick-to-belt" picking method.

Timm Gudehus describes in his book "Logistik" (Springer Verlag, 2004, ISBN 3-540-00606-0) the term "pick-to-belt" as a picking method where one picks onto a belt conveyor in a decentralized manner upon statically providing the articles. With the decentralized picking the provision units (e.g., storage containers) have a fixed location (e.g. lateral to the belt conveyor). A picking person moves, for the purpose of picking, within a (decentralized) working area (area lateral to the conveyor belt), in which a certain number of access locations (e.g., racks including storage containers) are present. Picking orders pass subsequently, with or without collecting containers, on the belt conveyor through different picking zones (i.e. working areas of the picker along the belt conveyor). If picking is performed without a collecting container, the articles are retrieved from the storage containers, and deposited directly on the belt conveyor into the assigned window. The belt conveyor can be divided for this purpose into the above-mentioned windows which are separated from each other optically (e.g., by means of colored prints) and/or physically (e.g., separating strips on the top the belt) in a manner recognizable to the picker. Window belts exist which have pitches at different lengths. The pitches are statical because they cannot be changed later.

In the above-mentioned picking zones the orders (i.e. the assigned collecting containers and/or windows on the belt) stop until required types and amounts of articles are manually retrieved from the storage containers, and deposited. Thereafter, the order can be transported to a subsequent picker (automatically), if necessary, who operates a downstream picking zone for processing next order lines of the order.

Alternatively, "pick-to-belt" is also frequently performed in terms of batch picking, which is also called two-stage picking, i.e. as many as possible customer orders, which contain the same type of article, are concentrated so that the picker retrieves this type of article for all customers orders simultaneously ($1^{st}$ stage), and then distributes the same to the associated orders. This reduces the pickers' walking distances, but requires, as a rule, an individualizing marker ("label") for the retrieved articles so that a subsequent sorting device can distribute the articles to the respective customer orders ($2^{nd}$ stage). The picker mark removed article, e.g., by an adhesive label, and then put the same on a belt which does not need to have a "window". The labelling is work-intense, and slows down the picking process.

In one-stage picking (collecting one order in one window) each of the windows is provided with an individualizing identification so that the picker can be told into which of the windows a specific article is to be deposited. This assignment (order to window) can also be performed just by the picker when the picker deposits the first articles of an order into a window which has not been assigned before, cf., for example, DE 10 2010 044 614 A1.

The conveying means, i.e. the belt, of the belt conveyor is not variable in length. The window is screened only coarsely. Residual pitches lead to losses of space on the belt. The belt must be manufactured specifically so that material-flow control can recognize the position of the belt (positions of the respective windows). For this purpose, for example, indexing holes (e.g., at the start of each windows) are used conventionally. Re-referencing has to be conducted frequently so that the material-flow control can recognize positions of windows accurately.

Different order-specific spatial requirements, which are defined by the amount and size of the articles of the order, cannot be considered with conventional window belts in that several (equally sized) windows (preferably one behind the other) are assigned to one order. Dynamic adaptation of the window size is not possible because the size is already set unchangeable when the belt is manufactured.

Besides the manual picking methods, also (fully) automatic picking methods exist. In these cases so-called automatic picking machines are used. An exemplary automatic picking machines is a so-called "A-frame", as described in U.S. Pat. No. 5,271,703 B. An A-frame comprises a basic frame having an A-shaped cross section. Vertically orientated supply channels are arranged along the basic frame horizontally, wherein vertically stored goods are automatically dispensed onto a deeper-arranged conveyor at a lower end of the storage channels. For example, a so-called window belt passes through the legs of the A-shaped cross section of the basic frame. Typically, the window belt is an endlessly circulating belt conveyor, a belt of which, or a conveying area defined by the belt, is divided virtually (and even physically by strips, if necessary) into a plurality of (collecting) windows (i.e. portions). In this context virtually means that the window boundaries are not optically recognizable but are recorded in terms of data in the computing system (material-flow controller) only. The computing system "sees" the window boundaries, and takes care that the articles are delivered into the correct window. Since picking is not conducted manually, the window boundaries do not need to be visible.

The window belt is moved, preferably continuously, through the A-shaped legs of the A-frame. The (picking) order is assigned, dependent on its scope, to one single window or several windows. If the window, or the associated order, passes a storage channel mounted on one of the sides of the A-frame one or more articles can be dispensed by means of a dispenser, which is provided at a lower end of each of the channels, in accordance with the (window or) order just passing the channel.

In general, the orders are assigned to the windows by means of an order-processing system, in particular before the windows pass, for example, through the A-frame. The order-processing system is typically integrated into a picking controller (e.g. warehouse-management controller) which can comprise, for example, a merchandise management system. The picking controller is typically implemented by a data-processing system.

The conventional window technology makes actually sense only when geometrically small articles, such as pharmaceuticals and drugs, are picked. The utilization of the window technology, when piece goods of bigger sizes or when high number of pieces are picked, is typically not put into practice because the window size, i.e. the window length, becomes too long if all piece goods belonging to the picking order are to be picked in terms of a "pile" into one single window.

If the picker picks manually into the window, namely independent of the size of the window, additional problems arise.

On the one hand it cannot be ensured certainly that the picker can actually deposit the retrieved piece good into the (correct) window which has been assigned to the order before.

Further, the deposition of a retrieved piece good is difficult if the window belt moves continuously because the picker needs to hit the right window. The deposition becomes more difficult the faster the window moves.

Additionally, it is difficult to signal to the picker exactly that window into which the picker is supposed to just deposit the retrieved piece good. Certainly, it is known to print consecutive numbers on the windows and to indicate to the picker the window number, which is assigned to the order, either on a display or acoustically. However, in this case the danger always exists that the picker forgets the information on the destination location, i.e. the designation window, into which the retrieved piece good is to be deposited on its (walking) path towards the destination window, or mixes up the window. In particular, with a consecutive numbering the danger exists that the picker allegedly means to know where the destination window is currently located, and nevertheless, or just because of that, deposits into the wrong window.

If several manual picking stations are arranged downstream one behind the other and are traversed by one and the same window conveyor, problems, which are caused by a mispositioning conducted upstream, propagate downstream, and occasionally get even intensified. When a first picker in a first picking zone, which is arranged further upstream, deposits one piece good into a wrong window it can happen, with a corresponding window size, that a second picker, who is positioned further downstream, cannot deposit its piece good into the window assigned to this piece good, because the piece good of the first picker already lies there. In this case the piece good, which is just to be deposited, cannot be deposited at all, or can only be deposited into another window which is wrong. In the last case the errors thus raise to a higher power.

The document DE 10 2015 105 942 A1 discloses method and apparatus for storing objects into a rack system.

The document DE 102 35 865 A1 discloses a device for conveying goods.

The post-published document DE 10 2018 203 175 A1 discloses a picking device including an image, which is located virtually within a working area.

It is an object to provide a window conveyor and an operating method overcoming the above-mentioned drawbacks.

This object is solved by a window-conveyor system for manually picking goods by a picker in accordance with a picking order, wherein the system comprises: a conveying device for transporting the goods along a conveying path, wherein the conveying device is movable continuously and discontinuously, and wherein the conveying device is movable, preferably continuously and discontinuously, and wherein the conveying device has a conveying area on which the goods can be deposited; a lighting device configured to indicate, in an order-specific manner, a portion of the conveying area in terms of an order-specific window by means of light in a manner which is visually distinguishable from a rest of the conveying area; and a controlling device configured to divide the conveying area into the order-specific window and the rest, and further configured to generate and output controlling signals to the lighting device which cause the lighting device to indicate the order-specific window on the conveying device in a visually distinguishable manner.

The windows are determined and indicated dynamically. The windows are flexible adjustable with regard to positions, distances, and sizes thereof. The conveyor can be operated with or without windows. The conveying means does not need to be specifically manufactured, because the windows can be projected onto the conveying means.

Preferably, the order-specific window comprises an order-specific spatial size which is variable adjustable, and in particular is indicated such that a deposition position of each of the goods of the picking order is indicated accurately within the window.

The size of the window is set in an order-specific manner. Each order can get assigned to a window having a different size. These windows can be assigned sequentially. The sequence of the orders does not need to be changed in order to allow assigning a window of an appropriate size to each order. The window size is adapted dynamically to the size of the order which is to be processed at present.

The pre-planning can reach even further so that each good within the window gets assigned to one good-specific deposition location which is indicated to the picker (by means of a projection). In this manner the goods can be arranged in a predetermined sequence within the window. The good-specific deposition location can be indicated by means of a visualized identification (outline area, name, ID, etc.) of the good. Due to the location-accurate depositioning of the goods, the control 16 can check and verify, for example, at the end of a picking section (for example, by means of a light barrier) whether or not the good has been actually deposited.

Further, it is advantageous that the system is further configured to move the order-specific window, during movement of the conveying area, synchronously with the conveying area.

Independent of the velocity by which the conveyor is operated, the respective window is always indicated at the correct location. There is no relative displacement on the conveyor. The conveyor can be operated at arbitrary velocities. The velocity can be constant, or variable. The conveyor can be operated continuously, or in a clocked manner.

The conveyor can be structured modularly, wherein the respective modules are operable at different velocities. Thereby, compression and pulling apart of each window, which is already partially occupied, can be effected. By stopping proceeding conveyors at a window boundary, the window which has changed to the subsequent conveyor, can be enlarged arbitrarily. Conversely, by stopping the subsequent conveyor, the window in the transition area relative to the proceeding conveyor can be reduced in size.

In particular, the system further comprises a measuring device for determining a velocity of the movement of the conveying area where the order-specific window is located.

The location-dependent and time-dependent measurement of the conveying velocity facilitates the above-mentioned synchronization of the visualization of the windows.

In accordance with a further preferred embodiment the system is configured to indicate only outer, in particular externally arranged, peripheries of the order-specific window.

There is no overlap of the visualized window boundary with collected goods. The window boundaries can always be recognized by the picker well. The window boundaries have a smaller area than the entire window so that the visualization is facilitated.

Preferably, the system is configured to indicate several order-specific windows for several picking orders on the conveying area at the same time.

This allows method of operation in parallel. Several pickers can process several orders at the same time, wherein each picker preferably gets fixedly assigned only one of the orders. Batch picking is possible because several articles of the same type can be retrieved, and then be distributed to several windows as well.

In particular, one individualizing color, in which the respective order-specific window is indicated, is assigned to each of the several picking orders.

The color code facilitates simultaneous working of several pickers because each of the pickers has its own color. Mispicking can be avoided, or at least reduced.

Further, it is advantageous that the order-specific window is projected from above onto the conveying area, or is projected from below through a at least partially transparent conveying means defining the conveying area.

The picker is not disturbed upon depositing the goods in the window. The picker has sufficient space for moving freely along the conveyor, in particular between the retrieval location and the windows (deposition locations).

It is particularly preferred when the conveying device is structured modularly, wherein several modules are arranged one by behind the other for forming the conveying path.

Another advantage is to be seen in that order-specific windows and/or areas of the rest of the conveying area, which are adjacent to the order-specific window, are illuminated.

The visualization of the window can be conducted in several manners. It can be visualized whether or not an article deposition is admissible. The window itself can be illuminated, or only boundaries thereof.

In particular, the conveying device is a roller conveyor, chain conveyor, link-chain conveyor, belt conveyor, or a driverless transport system.

The visualization of the windows is independent of the conveying means because the windows get projected. Roller conveyors, for example, cannot be used with the conventional static window technology where the boundaries are printed, or mounted, fixedly because gaps are provided between the rollers.

Further, it is advantageous if several order-specific windows are projected from above, and/or laterally to the conveying direction.

Additionally, the object is solved by a picking warehouse, or picking system, including a window-conveyor system, wherein the picking warehouse is configured to manually process picking orders, wherein a picker retrieves the goods in an order-specific manner from storage devices, and manually delivers them on the order-specific window visualized on the conveying area by means of the lighting device.

The object is further solved by a manual picking method including the steps of: order-specific visualizing a portion of a conveying area of an automatic conveying device in terms of an order-specific window by means of a lighting device in a visually distinguishable manner, in particular synchronously with movement of the conveying area; and collecting order-specific goods in the order-specific window by a picker, wherein the picker manually delivers the order-specific goods to the order-specific window visualized by light.

It goes without saying that the above-mentioned and hereinafter still to be explained features cannot only be used in the respectively given combination but also in other combinations or alone without departing from the scope of the present invention.

Embodiments of the invention are illustrated in the drawings, and will be explained in more detail in the following description.

FIG. 1 shows a block diagram of a picking warehouse including a window-conveyor system; and FIG. 2 shows a top view of a part of an exemplary picking warehouse.

FIG. 1 shows a block diagram of a window-conveyor system (hereinafter also referred to briefly as "system") 10 usable in a picking warehouse 11 (e.g., in a distribution center of a branch, or a shipping center of an online retailer).

The system 10 comprises a (window) conveying device 12, which is usable in-house, designated as a window conveyor in the following. Further, the system 10 comprises a lighting device 14 and a controlling device (e.g., a data processing device) 16. The controlling device 16 can be structured in a decentralized manner, and include both parts of a picking controller and parts of the controller of the conveying device 12 (e.g., velocity) and the lighting device 14 (synchronous co-moving with the windows).

The conveying device 12 is part of a conveyor technology 18, which in turn is part of the picking warehouse, or picking system, 11. The conveyor technology 18 can include steady conveyors such as belt conveyors 20, chain conveyors 22, roller conveyors 24, link-chain conveyors 26, etc., and/or unsteady conveyors such as man-operated floor conveyors (forklifts, platform trolleys, etc.), cranes, automatic truck-loading systems, driverless transport vehicles 28 (DTV), workpiece conveyors, as well as vertical conveyors such as elevating tables or belt lifters. It is clear that the types of conveyor technology mentioned here is not be understood limiting.

The lighting device 14 can be, for example, a laser pointer 30, a beamer 32, an emitter 34, a projector 36, or the like. The lighting device 14 includes a light source. It is clear that the types of lighting device mentioned here are not to be understood limiting.

The lighting device 14 is generally configured to direct light in an aimed manner to predetermined regions (windows) of the conveying device 12. This means in particular that the lighting device 14 can direct light to desired locations (e.g., window boundary) on the conveying device 12 for indicating windows 38 on a conveying area 42 such that a picker 40 can visually distinguish the same, cf. FIG. 2, in particular by means of a projection of light.

Each window 38 generally represents a portion of the conveying area 42 having a predefined length, and width, if necessary. This portion is assigned to a picking order. In this portion, or window, 38 such goods are collected which belong to this picking order assigned to the window 38. Thus, it concerns order-specific goods which are collected in the order-specific windows 38 by the picker 40 who deposits these goods there, namely directly, and/or in a collecting container positioned in the window 38. The picker 40 is notified, in accordance with the picking order, on goods which are to be retrieved from a (storage) location, and into which window 38 the retrieved goods are to be deposited, as it will be explained in more detail below. This notification can also be projected for the picker 40 on the conveying means, namely into the assigned window. The lighting device 14 may further be used for visualizing the retrieval location as well. Independent of the device visualizing the retrieval location, the visualizations of the retrieval location and the assigned window can be adjusted to each other (e.g., through the color of the light, a blinking frequency, etc.)

The picking warehouse 11 of FIG. 1 further includes storage devices 44 such as storage racks 46, storage containers 48, pallets on floor-deposition locations (not shown), and the like. Further the warehouse 11 includes a warehouse management computer (WMC) 50, a material-flow computer (MFC), and other data-processing devices required for operating the picking warehouse 11.

Further, an order-processing system (software and/or hardware) is provided, which is configured to determine in advance the size of the window 38. For this purpose the respective picking order is analyzed. The dimensions of the goods to be picked can be recorded, for example, in the WMC 50. Required space, in particular an area thereof, which is required for collecting all goods of the order in a (preferably) single window 28, can be determined in advance from the respective number goods to be picked.

Assuming that, for example, the entire width of the conveying means is used, a length can be determined order-specifically which is required on the conveyor 12 for collecting the goods. The size of the window 38 is also determined order-specifically in advance.

The same is true for the position of the windows 38 and relative intervals thereof. An order of the order processing can be influenced via the position of the windows 38.

The order processing can be part of the controller 16. Alternatively, the controller 16 is configured to communicate with the order processing for determining order-specifically the length/width, the interval, and the relative position of the assigned window on the conveying means.

FIG. 2 shows a top view of a part of an exemplary warehouse 11 including storage devices 44, for example, in terms of racks 46 and storage containers 48. Further, two conveying devices 12-1 and 12-2 are shown, which are formed exemplarily as belt conveyors 20. The belt conveyor 20-1 is a conventional window conveyor including static windows 38-1 to 38-4, which are set unchangeable with regard to its locations and sizes.

The windows 38-5 and 38-6 of the belt conveyor 20-2 of FIG. 2 can be set and represented dynamically with regard to locations and sizes thereof. The dynamic windows 38-5 and 38-6 of FIG. 2 have different lengths (direction X) but, for example, identical widths (direction Z). The width of the windows 38-5 and 38-6 extends over the entire width of the conveyor 20-2. However, the width can also be varied.

The dynamical windows 38-5 and 38-6 are not immediately adjacent to each other in the longitudinal direction X, i.e. they are arranged spaced to each other, and are visualized distinguishable by respective (lateral) markers 50. The markers 50 are generated by the lighting device 14, which is mounted, for example, above the conveyor 20-2 (e.g., on the sealing of the facility). The markers 50-1 and 50-2 visualize the dynamic window 38-5. The markers 50-3 and 50-4 visualize the dynamic window 38-6. If the dynamic windows 38 are immediately adjacent to each other (in the longitudinal direction X) less (e.g., three) (transversal) markers 50 are sufficient for visualizing in a distinguishable manner the respective start and the respective end of the windows 38.

In FIG. 2 the markers 50 visualize the boundaries of the windows 38 in the transversal direction Z of the conveyor 20-2. It is clear that the edges in the longitudinal direction may be also visualized (alternatively or additionally). The visualization of the (lateral) edge of the windows 38 can be inside or outside the windows 38. In FIG. 2 the markers 50 are exemplarily outside of the collecting area of the windows 38.

Further, the collecting area of the windows 38 may be illuminated completely (e.g. the entire area, not shown).

The markers 50 generated by light, which is projected in FIG. 2 by the lighting device 14 from above onto the conveying area 42 of the conveyor 20-2. It is clear that the lighting device 14 can also be arranged below the conveying area for visualizing the windows 38 from below. In this case the conveying means (the belt in FIG. 2) is to be formed transparently. For preventing the goods, which have already been deposited, from being shaded, the lighting device 14 can be arranged laterally as well. Preferably, multiple lighting devices 14 are used simultaneously for visualizing the same dynamic window 38.

The markers 50 are steered by the lighting device 14 such that they move synchronously with the conveyor 20-2. This means that it is irrelevant whether the conveyor 20-2 moves continuously, clocked, or at a velocity which is changing again and again. The controlling device 16 is, for this purpose, in data communication with the material-flow controller controlling the (conveyor) velocity of the conveyor 20-2, and forwards the same to the lighting device 14. Preferably, the conveying means of the conveying device 12 comprises an index, which is recognizable, for example, by a camera (not depicted) positioned, for example, in the vicinity of the lighting device 14 and comprising a field of view matching substantially with the field of view of the lighting device 14.

Besides the position of the dynamic window 38 also the size (length×width) can be set flexible, and different. For example, the window 38-5 is shorter than the window 38-6.

Further, the conveying means may not only be divided in length (direction X), but also in the width (direction Z) (not depicted).

The lighting device 14 may also be integrated directly into the conveying means itself. In this case, the conveying means comprises a plurality of light sources which can be operated individually, and arranged, preferably, along a regular raster so that the dynamic windows 38 can be visualized at a freely selectable location including a freely selectable length and/or width. A film having these characteristics may be adhered onto the conveying means. Parts of the conveying device which are static in the conveying direction, such as rollers or the frame, can be equipped with light sources.

Based on FIG. 2 some differences between the conventional window technology (upper half of FIG. 2) and a dynamic window technology (lower half of FIG. 2) will be explained in more detail below.

In FIG. 2 both concepts are illustrated at the same time. The upper (conventional) conveying device 12-1 including static windows 38-1 to 38-4 and the lower conveying device 12-2 including the dynamic windows 38-5 and 38-6 extend along the direction X in parallel, and are spaced to each other transversally in the direction Z. Storage devices 44 in terms of two rows (racks 46-1 to 46-7 and 46-8 to 46-14) loaded with storage containers 48 for storing the goods to be picked are arranged laterally and parallel to the conveying devices 12-1 and 12-2. The picker 40 can move along the racks 46 for retrieving the goods from the racks 46, and depositing the same into the windows 38. The windows 38 move, for example, at a constant velocity in the conveying direction 52 (cf. dark arrows parallel to the positive direction X).

The static windows 38-1 to 38-5 of the upper conveying device 12-1 of FIG. 2 each have the same length, and are printed with, for example, an individualizing number so that the picker 40 can deposit the goods into the desired window of the windows 38-1 to 38-5. The static windows 38-1 to 38-5 are visually separated from each other, for example, by means of printed separation stripes 54. It is clear that also a physically separation by means of bars (not depicted) is also possible, which are mounted on the conveying area 42 at a fixed distance. Since the separation between the static windows 38-1 to 38-5 is of a permanent nature, the relative positions, relative distances, and sizes of the windows 38-1 to 38-5 cannot be changed any more (later). Therefore, the windows 38-1 to 38-5 are "static".

The windows 38-5 and 38-6 are "dynamic" with regard to positions, distances, and/or sizes thereof because these parameters can be changed on demand at any time. If necessary, the size of the window can also be changed during a picking process. The picker 40 determines, for example, that the size of the window is not sufficient for collecting all goods therein, and outputs a corresponding signal to the controlling device 16 and/or the WMC 50 which then adapts the size if space exits.

If desired, even accurate deposition positions for the goods can be (additionally) visualized accurately within one window by means of the lighting device 14. The accurate deposition position represents a partial region of the window where the goods are to be deposited.

Further, it is clear that the dynamic windows 38 can also be visualized temporally discreet, if desired. This means that, for example, only the window 38 is visualized which is actually operated by the picker 40. Also, it is possible to visualize the windows 38-5 and 38-6 individually and only on demand. In particular, a drone can be assigned (temporarily or permanently) to exactly one picker (for further functionalities, if necessary).

The lighting device 14 may also be mounted on an unmanned aerial vehicle (e.g., a drone) for creating the visualization of the dynamic windows 38 even more dynamic. The aerial vehicle may be directed to locations where visualization is actually required so that less lighting devices 14 are required in comparison to the case where the lighting devices 14 are installed permanently and spatially fixed.

The lighting device 14 can be configured to visualize each of the dynamic windows 38 in a different color. This is advantageous if several pickers 40 work at the same time at the same conveying device 12, because each picker 40 can get assigned its own color so that the picker 40 can find "its" window 38 faster and easier.

It is clear that the above-described concept of dynamic window technology is independent of the type of the used conveying device. The conventional window technology is used with steady conveyors only, in particular with belt conveyors. The dynamic window technology, however, can also be used with roller conveyors, although the conveying area 42 is not formed continuously. Gaps are present between the rollers which interrupt the conveying area 42.

In addition, the dynamic windows 38 can also be used with unsteady conveyors such as DTV. The DTV also comprises a conveying, or transporting, area which can be divided arbitrarily for defining collection areas, for example, on the top of the DTV.

The conveying means of the conveying device 12 preferably has a light color for assisting and enhancing the visualization of the windows 38.

LIST OF REFERENCE NUMERALS

10 window-conveyor system
11 picking warehouse
12 (window-) conveying device/conveyor
14 lighting device
16 controlling device
18 conveyor technology
20 belt conveyor
22 chain conveyor
24 roller conveyor
26 link-chain conveyor
28 transport vehicle
30 laser pointer
32 beamer
34 emitter
36 projector
38 window
40 picker
42 conveying area
44 storage device
46 storage rack
48 storage container
50 marker
52 conveying direction
54 separation stripe

The invention claimed is:

1. A window-conveyor system for a manually picking goods through a picker in accordance with a picking order, wherein the picking order is a customer's order constituted by several order lines including a respective quantity of a line-specific type of article, wherein the system comprises:

a conveying device for transporting the goods along a conveying path, wherein the conveying device is movable, preferably continuously and discontinuously, and wherein the conveying device has a conveying area onto which the goods can be deposited;

a lighting device configured to indicate in an order-specific manner a portion of the conveying area in terms of an order-specific window by means of light visually distinguishable, wherein the order-specific window has a variable adjustable order-specific spatial size determined in advance by an order-processing system, wherein the window has a pre-defined length required on the conveying device for collecting within the order-specific window the order-specific goods belonging to the picking order assigned to the window; and a controlling device configured to divide the conveying area into the order-specific window and the rest, and further configured to generate controlling signals for the lighting device, and output the same which cause the lighting device to indicate the order-specific window visually distinguishable on the conveying device.

2. The system of claim 1, wherein the order-specific window is indicated such that that a deposition position of each of the goods of the picking order is indicated accurately within the window.

3. The system of claim 1, being further configured to move the order-specific window, upon movement of the conveying area, synchronously with the conveying area.

4. The system of claim 3, further comprising a measuring device for determining a velocity of the movement of the conveying area where the order-specific window is located.

5. The system of claim 1, being configured to indicate outer peripheries of the order-specific window only.

6. The system of claim 1, being configured to indicate at the same time several order-specific windows for several picking orders on the conveying area.

7. The system of claim 6, wherein an individualizing color, in which the respective order-specific window is indicated, is assigned to each of the several picking orders.

8. The system of claim 1, wherein the order-specific window is projected from above onto the conveying area, or is projected from below through a conveying means which defines the conveying area and is at least partially transparent.

9. The system of claim 1, wherein the conveying device is structured modularly, and wherein several modules are arranged one behind the other for forming the conveying path.

10. The system of claim 1, wherein the order-specific window and/or regions of the rest of the conveying area, which are adjacent to the order-specific window, are illuminated.

11. The system of claim 1, wherein the conveying device is one of a roller conveyor, chain conveyor, link-chain conveyor, belt conveyor, or a driverless transport vehicle.

12. The system of claim 1, wherein several order-specific windows are projected from above, and/or laterally to a conveying direction.

13. A picking warehouse including a window-conveyor system in accordance with claim 1, wherein the picking warehouse is configured to process picking orders manually, wherein a picker retrieves the goods in an order-specific manner from storage devices and manually delivers the same to the order-specific window, which is visualized on the conveying area by means of the lighting device.

14. A method for materially picking including the steps of:

order-specific visualizing a portion of a conveying area of an automatic conveying device in terms of an order-specific window by means of a lighting device in a visually distinguishable manner, in particular synchronous with movement of the conveying area, wherein the order-specific window comprises a variable adjustable order-specific spatial size which is predetermined by an order-processing system, wherein the window has a pre-defined length required on the conveying device for collecting the order-specific goods within the order-specific window, which belongs to the picking order being assigned to the window; and collecting order-specific goods within the order-specific window through a picker, wherein the picker manually delivers the order-specific goods to the order-specific window visualized by light.

\* \* \* \* \*